United States Patent [19]
Warakomski

[11] Patent Number: 5,977,253
[45] Date of Patent: Nov. 2, 1999

[54] PHENOLIC THERMOSETTING RESINS CONTAINING POLYOLS

[75] Inventor: Michelle Warakomski, Williamsville, N.Y.

[73] Assignee: Occidental Chemical Corporation, Dallas, Tex.

[21] Appl. No.: 09/032,907

[22] Filed: Mar. 2, 1998

[51] Int. Cl.$^6$ .............................. C08G 08/28; C08G 63/91
[52] U.S. Cl. .................... 525/58; 524/904; 524/593; 525/934; 528/159; 528/501; 528/161
[58] Field of Search ............... 525/58, 934; 524/583, 524/904; 528/142, 161

[56] References Cited

U.S. PATENT DOCUMENTS

| | | | |
|---|---|---|---|
| 3,607,598 | 9/1971 | LeBlanc et al. | 525/58 |
| 4,131,582 | 12/1978 | Kako et al. | 524/510 |
| 4,157,324 | 6/1979 | Culbertson | 528/144 |
| 4,748,214 | 5/1988 | Asami et al. | 525/58 |
| 5,548,015 | 8/1996 | Bourlier et al. | |
| 5,552,186 | 9/1996 | Bourlier et al. | |

FOREIGN PATENT DOCUMENTS

| | | |
|---|---|---|
| 543646 | 8/1981 | Australia . |
| 561636 | 8/1958 | Canada . |
| 573099 | 3/1959 | Canada . |
| 4012-590 | 3/1974 | Japan . |
| 2006-742 | 1/1977 | Japan . |
| 5136-170 | 10/1980 | Japan . |
| 7078-470 | 5/1982 | Japan . |
| 0161-369 | 8/1985 | Japan . |

*Primary Examiner*—Tae Yoon
*Attorney, Agent, or Firm*—Anne E. Brookes; Richard D. Fuerle

[57] ABSTRACT

Disclosed is a resol phenolic thermosetting resin made by preparing a composition of formaldehyde and a phenol in a molar ratio of about 1:1 to about 3:1, about 1 to about 20 wt %, based on the weight of said composition, of a phenol-formaldehyde polymerization catalyst, and about 0.5 to about 10 wt %, based on the weight of said phenol, of a polyvinyl alcoholic compound. The phenol can be benzophenol, an alkyl from $C_1$ to $C_{12}$ phenol, a bisphenol, or a mixture thereof. The bisphenol can be bisphenol A, bisphenol F, or bisphenol S. The polyvinyl alcoholic compound can be polyvinyl alcohol, polyvinyl acetate, an acetal derived from polyvinyl alcohol, or a mixture thereof. The composition is heated at about 50 to about 120° C. to form the resin.

19 Claims, No Drawings

PHENOLIC THERMOSETTING RESINS CONTAINING POLYOLS

CROSS-REFERENCE TO RELATED APPLICATIONS

This application is related to application Ser. No. 09/131,347, filed Aug. 10, 1998 by Qi Wang, Sandor Nagy, and Ramesh Krishnamurti, titled, "Inhibiting Scale in Vinyl Chloride Polymerization."

BACKGROUND OF THE INVENTION

This invention relates to a resol phenolic thermosetting resin that contains a polyvinyl alcoholic compound. In particular, it relates to thermosetting resins based on bisphenol A, formaldehyde, and polyvinyl alcohol.

Metal containers have been lined with phenol formaldehyde thermosetting resins to protect the containers from corrosive contents and to protect the contents (e.g., food) from contamination by the metal container. In addition to resisting attack by solvents and corrosive materials, resins used for these applications must cure rapidly and adhere well to metals.

SUMMARY OF THE INVENTION

I have discovered that a resol phenolic thermosetting resin that incorporates a polyvinyl alcoholic compound has a faster rate of cure than does an unmodified resin. The resins of this invention are ideally suited for use in lining metal containers.

DESCRIPTION OF THE PREFERRED EMBODIMENTS

To prepare a resin according to this invention, formaldehyde and a phenol are mixed in a molar ratio of about 1:1 to about 3:1. At a ratio greater than about 3:1 the resin becomes difficult to fabricate and will not adhere as well to metals. At a ratio of less than about 1 some of the phenol will not react. The preferred molar ratio of formaldehyde to phenol is about 1.5:1 to about 2.5:1.

Phenols that can be used include benzophenol, alkyl from $C_1$ to $C_{12}$ phenols, bisphenols, and mixtures thereof. The alkyl group in the alkyl phenols is preferably from $C_4$ to $C_{12}$. Examples of alkyl phenols include p-tertiary octyl phenol, nonyl phenol, and dodecyl phenol. Examples of bisphenols include bisphenol A (4,4'-isopropylidenediphenol), bisphenol F (4,4'-methylenebis[phenol]), and bisphenol S (4,4'-sulfonylbisphenol); bisphenol A is preferred because it is inexpensive, readily available, and forms resins that are highly chemically resistant and easy to fabricate.

The resin formulation contains about 0.5 to about 10 wt %, based on phenol weight, of a polyvinyl alcoholic compound, which can be polyvinyl alcohol (PVA, also called "hydrolyzed polyvinyl acetate"), polyvinyl acetate, or an acetal derived from polyvinyl alcohol, such as polyvinyl butryal (PVB), or polyvinyl formal. If less than about 0.5 wt % is used, the properties of the resin are not significantly affected by the presence of the polyvinyl alcoholic compound and if more than about 10 wt % is used, the resin will begin to lose chemical resistance and will be hard to fabricate. Preferably, about 2 to about 5 wt % of the polyvinyl alcoholic compound is included. The polyvinyl alcoholic compound is preferably a polymer of a monomer having the general formula $CH_2=C(R)OH$, where R is hydrogen or alkyl from $C_1$ to $C_6$; preferably, R is hydrogen because PVA has been found to work well.

About 1 to about 20 wt %, based on phenol weight, of a phenol-formaldehyde polymerization catalyst is required. At less than 1 wt % the reaction does not go to completion and more than 20 wt % catalyst is unnecessary and wasteful. Preferably, about 8 to about 15 wt % of the catalyst is used. Any conventional phenol-formaldehyde catalyst, such as various amines and hydroxides, can be used as a catalyst. Examples include caustic (NaOH), triethylamine, ammonia, lithium hydroxide, ammonium hydroxide, and triethanolamine. The preferred catalyst is triethylamine.

The resin formulation can be prepared by mixing together the components in any order, but it is preferable to add the polyvinyl alcoholic compound last for ease in processing. The resin formulation is heated to a temperature of about 50 to about 120° C., and preferably to a temperature of 60 to about 80° C., and is held at that temperature until the reaction is over. The end of the reaction can be determined by sampling and curing, by determining the molecular weight of the resin, or by monitoring the presence of the reactants in the reaction mixture. The polyvinyl alcoholic compound is preferably added when the temperature is about 70 to about 100° C. The reaction is permitted to proceed until the polyvinyl alcoholic compound has dissolved into the resin.

The product can be made solventless by dehydrating the product mixture in a vacuum to remove the water, if water is present. The resulting solids can then be broken up into powder or flake and used in a coating system. That solid product can be dissolved in a solvent as needed. It can be used to coat cans, metal drums, tanks, etc. The water can also be left in the resin or a solvent can be added to the resin.

The following examples further illustrate this invention.

EXAMPLES

The reactants, solvent, and catalyst were loaded into a glass flask fitted with stirrer, thermometer, and set for reflux. The temperature was raised to 65 to 70° C. for about ½ hour, then the temperature was raised to reflux. The reaction was monitored by means of % free formaldehyde and cure profiles. When a sample taken from the reaction mixture cured on a hot plate at 185° C. in 80 to 90 sec. the mixture was vacuum distilled until another sample cured in 120 sec on a 150° C. hot plate. The resin was discharged into a tray. The following tables give the reactants, solvent, catalyst, reaction conditions, and results. Molecular weight was determined using a Waters 150C gel permeation chromatograph. Free formaldehyde was determined using the hydroxylamine hydrochloride method.

| EXAMPLES 1 to 6 | | | | | | |
|---|---|---|---|---|---|---|
|  | 1 | 2 | 3 | 4 | 5 | 6 |
| Bisphenol A | 100.0 | 100.0 | 100.0 | 100.0 | 100.0 | 100.0 |
| 45% Formaldehyde | 53.8 | 53.8 | 53.8 | 53.8 | 53.8 | 53.8 |
| Glycol Ether (1) | 4.5 | 4.5 | 4.5 | 4.5 | 4.5 | 4.5 |
| Triethylamine | 8.0 | 8.0 | 8.0 | 8.0 | 8.0 | 8.0 |
| Polyvinyl Alcohol (2) | 2.9 | 2.9 | 2.9 | 2.9 | 1.0 | 4.0 |
| Cure @ 150 (sec) | 105 | 83 | 75 | 69 | 72 | 68 |
| Capillary Shrink Point (° C.) (3) | 54 | 66 | 65 | 63 | 61 | 60 |
| Capillary Melt Point (° C.) (4) | 63 | 75 | 75 | 74 | 71 | 70 |
| % Free Formaldehyde | 0.35 | 0.4 | 0.4 | 0.35 | 0.5 | 0.45 |
| Average Molecular Weight | 1279 | 1605 | 2712 | 3270 | 2277 | 2293 |

1. Also known as butyl Cellosolve
2. A partially hydrolyzed PVA sold by Air Products as grade 205

-continued

3. A capillary tube is filled about 1/8 inch (0.3 cm) with powdered resin and slowly heated until it completely melts and becomes translucent.
4. A capillary tube is filled about 1/8 inch (0.3 cm) with powdered resin and slowly heated until it first contracts away from the side of the capillary tube.

EXAMPLES 7 AND 8

|  | 7 |  | 8 |
|---|---|---|---|
| Bisphenol A | 80.0 | Bisphenol A | 80.0 |
| para tertiary butyl phenol | 20.0 | Octyl Phenol | 20.0 |
| 45% Formaldehyde | 53.8 | 45% Formaldehyde | 53.8 |
| Glycol Ether | 4.5 | Glycol Ether | 4.5 |
| Triethylamine | 8.0 | Triethylamine | 8.0 |
| Polyvinyl Alcohol -205 | 2.9 | Polyvinyl Alcohol - 205 | 2.9 |
| Cure @ 150 (sec) | 104 | Cure @ 150 (sec) | 102 |
| Capillary Shrink Point (° C.) | 53 | Capillary Shrink Point (° C.) | 42 |
| Capillary Melt Point (° C.) | 61 | Capillary Melt Point (° C.) | 54 |
| % Free Formaldehyde | 0.45% | Free Formaldehyde | 0.8 |
| Average Molecular Weight | 1843 | Averge Molecular Weight | 1481 |

EXAMPLES 9 TO 11

|  | 9 |  | 10 |  | 11 |
|---|---|---|---|---|---|
| Bisphenol A | 100.0 | Bisphenol A | 100.0 | Bisphenol A | 100.0 |
| 45% Formaldehyde | 53.8 | 45% Formaldehyde | 53.8 | 45% Formaldehyde | 53.8 |
| Glycol Ether | 4.5 | Trethylamine | 8.0 | Triethylamine | 8.0 |
| Triethylamine | 8.0 | Methanol | 16.7 | Methanol | 22.9 |
| Polyvinyl Alcohol (1) | 2.9 | Polyvinyl Butyral (2) | 2.3 | Water | 4.1 |
|  |  |  |  | Polyvinyl Butyral (3) | 2.3 |
| Cure @ 150 (sec) | 42 | Cure @ 150 (sec) | 88 | Cure @ 150 (sec) | 102 |
| Capillary Shrink Point (° C.) | 70 | Capillary Shrink Point (° C.) | 70 | Capillary Shrink Point (° C.) | 60 |
| Capillary Melt Point (° C.) | 80 | Capillary Melt Point (° C.) | 81 | Capillary Melt Point (° C.) | 70 |
| % Free Formaldehyde | 0.55% | Free Formaldehyde | 0.35% | Free Formaldehyde | 0.35 |
| Average Molecular Weight | 4401 | Average Molecular Weight | 3517 | Average Molecular Weight | 1772 |

1. A fully hydrolyzed PVA sold by Air Products as grade 107
2. A lower MW PVB sold by Air Products as grade 72
3. A higher MW PVB sold by Air Products as grade 90

EXAMPLES 12 TO 14

|  | 12 |  | 13 |  | 14 |
|---|---|---|---|---|---|
| Bisphenol A | 100.0 | Bisphenol A | 100.0 | Bisphenol A | 100.0 |
| 45% Formaldehyde | 55.0 | 45% Formaldehyde | 53.8 | 45% Formaldehyde | 53.8 |
| Zinc Acetate Dihydrate | 6.0 | Triethylamine | 8.0 | Triethylamine | 8.0 |
| Methanol | 6.3 | Glycol Ether | 4.5 | Glycol Ether | 4.5 |
| Water | 4.2 | Methanol | 3.3 | Methanol | 4.2 |
| Polyvinyl Alcohol - 205 | 2.9 | Xylene | 5.0 | Xylene | 6.3 |
|  |  | Polyvinyl Formal (1) | 2.3 | Polyvinyl Formal (2) | 2.3 |
| Cure @ 150 (sec) | 66 | Cure @ 150 (sec) | 115 | Cure @ 150 (sec) | 122 |
| Capillary Shrink Point (° C.) | 56 | Capillary Shrink Point (° C.) | 61 | Capillary Shrink Point (° C.) | 58 |
| Capillary Melt Point (° C.) | 65 | Capillary Melt Point (° C.) | 71 | Capillary Melt Point (° C.) | 68 |
| % Free Formaldehyde | 1.25% | Free Formaldehyde | 0.4 | % Free Formaldehyde | 0.3 |
| Average Molecular Weight | 1028 | Average Molecular Weight | 2052 | Average Molecular Weight | 1479 |

1. Sold by Chisso Corp. as grade "K"
2. Sold by Chisso Corp. as grade "E"

The above Examples show that resins made with bisphenol A are better when the bisphenol A is not reacted with another phenol, such as p-t-butyl phenol (Example 7) or octyl phenol (Example 8). Partially hydrolyzed PVA (Example 1) is better than fully hydrolyzed PVA (Example 9) and triethylamine is better than zinc acetate.

I claim:

1. A solid resol phenolic thermosetting resin comprising a solid product formed by
   I. preparing a composition which comprises
      (A) a phenol selected from the group consisting of benzophenol, $C_1$ to $C_{12}$ alkyl phenols, bisphenols, and mixtures thereof;
      (B) formaldehyde in a molar ratio to said phenol of about 1:1 to about 3:1;
      (C) about 1 to about 20 wt %, based on the weight of the composition, of a phenol-formaldehyde polymerization catalyst; and
      (D) about 0.5 to about 10 wt %, based on the weight of said phenol, of a polyvinyl alcoholic compound selected from the group consisting of polyvinyl alcohol, polyvinyl acetate, acetals derived from polyvinyl alcohol, and mixtures thereof,
   II. heating said composition to react said polyvinyl alcoholic compound, said phenol, and said formaldehyde to form a reaction product; and
   III. dehydrating said reaction product.

2. A solid resol phenolic thermosetting resin according to claim 1 wherein said polyvinyl alcoholic compound is polyvinyl alcohol.

3. A solid resol phenolic thermosetting resin according to claim 1 wherein said polyvinyl alcoholic compound is polyvinyl acetate.

4. A solid resol phenolic thermosetting resin according to claim 1 wherein said polyvinyl alcoholic compound is an acetal derived from polyvinyl alcohol.

5. A solid resol phenolic thermosetting resin according to claim 1 wherein said polyvinyl alcoholic compound is a polymer of a monomer having the general formula $CH_2 = C(R)OH$, where R is hydrogen or alkyl from $C_1$ to $C_6$.

6. A solid resol phenolic thermosetting resin according to claim 1 wherein said phenol is an alkyl phenol.

7. A solid resol phenolic thermosetting resin according to claim 6 wherein said phenol is selected from the group consisting of p-tertiary octyl phenol, nonyl phenol, and dodecyl phenol.

8. A solid resol phenolic thermosetting resin according to claim 1 wherein said phenol is a bisphenol.

9. A solid resol phenolic thermosetting resin according to claim 8 wherein said bisphenol is bisphenol A.

10. A solid resol phenolic thermosetting resin according to claim 1 wherein said formaldehyde is in an aqueous solution.

11. A solid resol phenolic thermosetting resin according to claim 1 wherein said reaction product is broken up into powder or flake.

12. A solid resol phenolic thermosetting resin according to claim 1 wherein said phenol formaldehyde polymerization catalyst is triethylamine.

13. A solid resol phenolic thermosetting resin made by
    (A) preparing a composition which comprises formaldehyde and a phenol selected from the group consisting of benzophenol, a $C_4$ to $C_{12}$ alkyl phenol, bisphenol A, bisphenol F, bisphenol S, and mixtures thereof in a molar ratio of formaldehyde to phenol of about 1.5:1 to about 2.5:1, and about 8 to about 15 wt %, based on the weight of said composition, of a phenol-formaldehyde polymerization catalyst;

(B) heating said composition to about 70 to about 100° C. to form a resin;

(C) adding to said resin about 2 to about 5 wt %, based on the weight of said phenol, of a polyvinyl alcoholic compound selected from the group consisting of polyvinyl alcohol, polyvinyl acetate, an acetal derived from polyvinyl alcohol, and mixtures thereof;

(D) heating said resin until said polyvinyl alcoholic compound dissolves into said resin and reacts with said resin;

(E) dehydrating said resin to form said solid resol phenolic thermosetting resin; and (F) breaking up said solid resol phenolic thermosetting resin into powder or flake.

14. A solid resol phenolic thermosetting resin according to claim 13 wherein said polyvinyl alcoholic compound is polyvinyl alcohol.

15. A solid resol phenolic thermosetting resin according to claim 13 wherein said phenol is bisphenol A.

16. A solid resol phenolic thermosetting resin made by (A) preparing a composition which comprises formaldehyde and bisphenol A in a molar ratio of about 1.5:1 to about 2.5:1, and about 8 to about 15 wt %, based on the weight of said composition, of a phenol-formaldehyde polymerization catalyst;

(B) heating said composition to about 60 to about 80° C. until the reaction of said formaldehyde with said bisphenol A is complete and a resin is formed;

(C) adding to said resin about 2 to about 5 wt %, based on the weight of said bisphenol A, of polyvinyl alcohol;

(D) heating said resin to about 70 to about 100° C. until said polyvinyl alcohol dissolves into said resin and reacts with said resin; and (E) dehydrating said resin to form said solid resol phenolic thermosetting resin.

17. A solid resol phenolic thermosetting resin according to claim 16 wherein said formaldehyde is in an aqueous solution.

18. A solid resol phenolic thermosetting resin according to claim 16 wherein, after step (E), said reaction product is broken up into powder or flake.

19. A solid resol phenolic thermosetting resin according to claim 16 wherein said phenol formaldehyde polymerization catalyst is triethylamine.

* * * * *